United States Patent
Broulidakis et al.

(10) Patent No.: US 9,771,829 B2
(45) Date of Patent: Sep. 26, 2017

(54) CUTOUTS IN GAS TURBINE STRUCTURES FOR DEFLECTION CONTROL

(71) Applicant: United Technologies Corporation, Hartford, CT (US)

(72) Inventors: Alexander Broulidakis, Tolland, CT (US); Michael D. Collier, Manchester, CT (US); Patrick M. Devaney, Newington, CT (US); Patrick M. Nadeau, Newington, CT (US); Joseph J. Sedor, Oxford, MA (US); Christopher Treat, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 186 days.

(21) Appl. No.: 14/685,115

(22) Filed: Apr. 13, 2015

(65) Prior Publication Data

US 2016/0298493 A1 Oct. 13, 2016

(51) Int. Cl.
| | |
|---|---|
| *F01D 25/24* | (2006.01) |
| *F01D 25/28* | (2006.01) |
| *F01D 25/26* | (2006.01) |
| *F01D 9/06* | (2006.01) |
| *F01D 25/16* | (2006.01) |

(52) U.S. Cl.
CPC ............ *F01D 25/26* (2013.01); *F01D 9/065* (2013.01); *F01D 25/162* (2013.01); *F01D 25/243* (2013.01); *F01D 25/246* (2013.01); *F01D 25/28* (2013.01); *F01D 25/24* (2013.01); *F05D 2260/231* (2013.01); *F05D 2260/30* (2013.01); *Y02T 50/675* (2013.01)

(58) Field of Classification Search
CPC ...... F01D 25/24; F01D 25/243; F01D 25/246; F05D 2240/14; F05D 2240/91; F05D 2260/941; F02C 7/20; F02K 1/82; F02K 1/822; F02K 1/827; F23R 3/002; F23R 3/06

See application file for complete search history.

(56) References Cited

U.S. PATENT DOCUMENTS

| | | | | |
|---|---|---|---|---|
| 2,875,579 A | * | 3/1959 | Gerdan ...................... | F02C 7/20 60/726 |
| 3,902,899 A | * | 9/1975 | Sponseller .............. | C22C 38/44 420/53 |

(Continued)

FOREIGN PATENT DOCUMENTS

| | | |
|---|---|---|
| EP | 2584152 | 4/2013 |
| EP | 3048259 | 7/2016 |

OTHER PUBLICATIONS

Extended European Search Report dated Aug. 19, 2016 in European Application No. 16164954.6.

*Primary Examiner* — Gerald L Sung
*Assistant Examiner* — Rene Ford
(74) *Attorney, Agent, or Firm* — Snell & Wilmer, L.L.P.

(57) ABSTRACT

A mid-turbine frame is provided. The mid-turbine frame may comprise an inner case having an annular surface with an interface section disposed on the annular surface. The interface section may include an interface feature. A balancing section may be disposed on the annular surface defining an opening and disposed circumferentially adjacent the interface section.

17 Claims, 5 Drawing Sheets

(56) References Cited

U.S. PATENT DOCUMENTS

| | | | | |
|---|---|---|---|---|
| 4,920,742 A | * | 5/1990 | Nash | F01D 25/162 |
| | | | | 415/116 |
| 5,634,767 A | * | 6/1997 | Dawson | F01D 25/246 |
| | | | | 415/134 |
| 2011/0079019 A1 | * | 4/2011 | Durocher | F01D 5/082 |
| | | | | 60/796 |

* cited by examiner

CUTOUTS IN GAS TURBINE STRUCTURES FOR DEFLECTION CONTROL

FIELD OF INVENTION

The present disclosure relates to gas turbine engines, and, more specifically, to a mid-turbine frame or other engine component with cutouts for deflection control.

BACKGROUND

Gas turbine engines may operate at high temperatures in turbine sections and combustor sections. Gas temperatures in compressor sections are also rising as air is compressed to higher pressures. A static structure in a gas turbine engine may expand and/or contract as temperatures vary. If the static structure has a varied surface area or a large area of material concentrated asymmetrically, then the static structure may expand and/or contract inconsistently. For example, a circular static component centered about an axis of rotation of a gas turbine engine may take on an oblong or elliptical shape as the static component heats and/or shifts the center of the circular static component. In the case of a mid-turbine frame, an oblong or elongated shape may cause excessive shift in the in attached components resulting in undesirable friction and/or contact in the engine.

SUMMARY

A mid-turbine frame may comprise an inner case having an annular surface with an interface section disposed on the annular surface. The interface section may include an interface feature. A balancing section may be disposed on the annular surface defining an opening and disposed circumferentially adjacent the interface section.

In various embodiments, a metal cover may be configured to cover the opening. The metal cover may be riveted to the annular surface. The annular surface may comprise a plurality of balancing sections defining a plurality of openings with the balancing sections distributed about the annular surface. The inner case may be configured to maintain a circular geometry in response to at least one of a mechanical change or a thermal change. The inner case may further be configured to maintain a stationary center point in response to at least one of a mechanical change or a thermal change. The inner case may comprise a nickel-chromium-based alloy.

A gas turbine engine may comprise a compressor configured to rotate about an axis. A combustor may be disposed aft of the compressor and in fluid communication with the compressor. A high-pressure turbine may be aft of the compressor and in fluid communication with the combustor. A low-pressure turbine may be aft of the high-pressure turbine and in fluid communication with the high-pressure turbine. A mid-turbine frame may be disposed between the high-pressure turbine and the low-pressure turbine. The mid-turbine frame may comprise an interface section on the mid-turbine frame including an interface feature. A balancing section may be disposed on the mid-turbine frame. The balancing section may define an opening and be disposed adjacent the interface section.

In various embodiments, a metal cover may be configured to cover the opening. The metal cover may be riveted to the annular surface. The mid-turbine frame may comprise a plurality of balancing sections defining a plurality of openings with the balancing sections distributed about the mid-turbine frame. The mid-turbine frame may be configured to maintain a circular geometry in response to a thermal change. The mid-turbine frame may be configured to maintain a stationary center point in response to the thermal change. The mid-turbine frame may comprise a nickel-chromium-based alloy. The mid-turbine frame may also comprise an inner frame, an outer frame disposed radially outward from the inner frame, and a strut (or rod) coupled to the inner frame and the outer frame.

A static structure may comprise an annular surface, and an interface section of the annular surface comprising an interface feature. A balancing section of the annular surface may define an opening. The balancing section may also be disposed circumferentially adjacent the interface section.

In various embodiments, a metal cover may be configured to cover the opening. The metal cover may be riveted to the annular surface. The annular surface may be configured to maintain a circular geometry in response to at least one of a mechanical change or a thermal change. The annular surface may be configured to maintain a stationary center point in response to at least one of a mechanical change or a thermal change.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
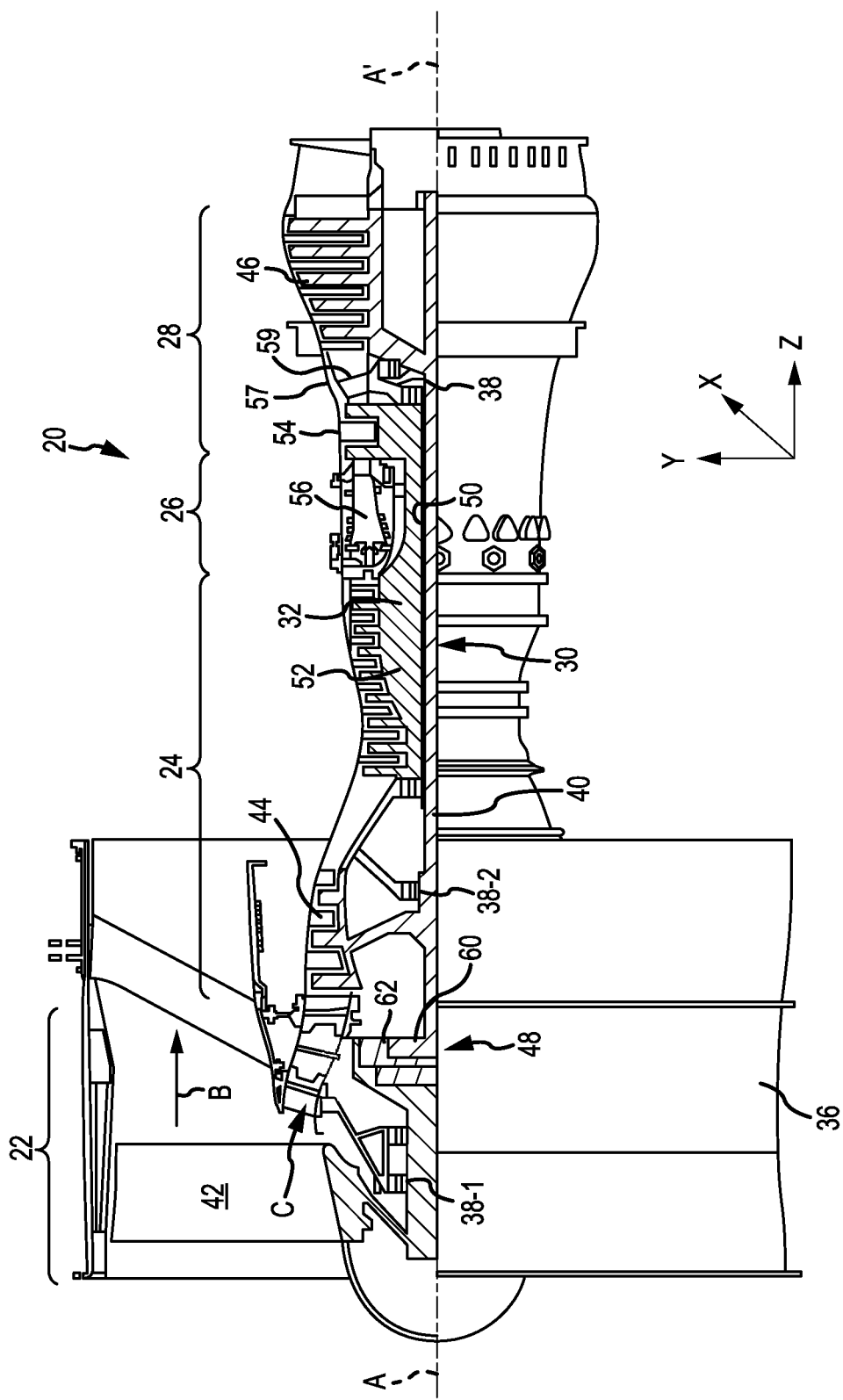
FIG. 1 illustrates a cross-sectional view of an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46 to extract energy from the burned mixture. Mid-turbine frame 57 includes airfoils 59 which are in the core airflow path. Mid-turbine frame 57 may also contact bearing system 38 such that excessive deflection of mid-turbine frame 57 may interfere with engine operation. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

An engine frame structure (e.g., a mid-turbine frame or other static structure in a gas turbine engine) may be coupled to a bearing housing. The bearing housing may house bearing system 38, which may have an impact on the radial position of rotating components in gas turbine engine 20. An engine frame structure such as mid-turbine frame 57 may have balance openings to limit deflection and keep mid-turbine frame 57 and bearing system 38 centered about axis of rotation A-A'.

Figure 2:
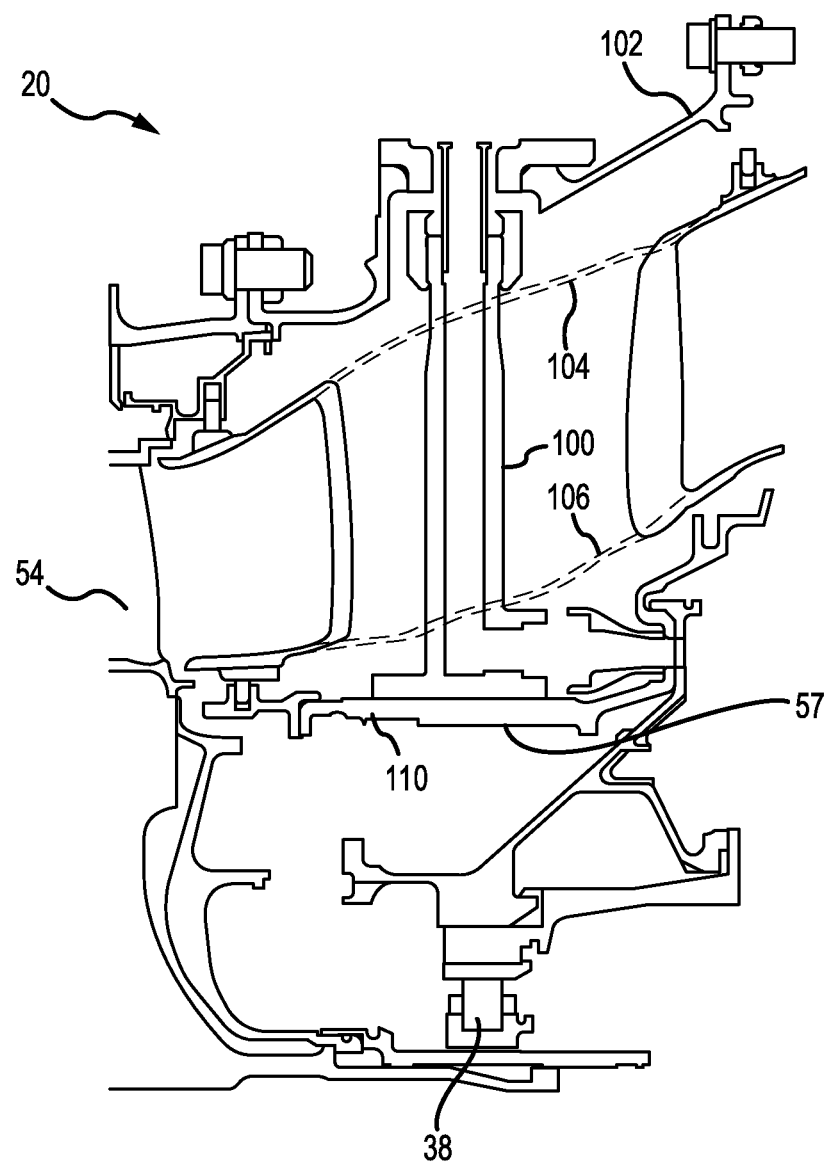
FIG. 2 illustrates a cross sectional view of a turbine section with a mid-turbine frame, in accordance with various embodiments.

With reference to FIG. 2, an exemplary mid-turbine frame 57 of gas turbine engine 20 is shown, in accordance with various embodiments. Mid-turbine frame 57 may be a static structure disposed proximate (aft as depicted) of a rotating structure such as high pressure turbine 54. Mid-turbine frame 57 may be proximate bearing system 38 and mechanically coupled to bearing system 38 so that deflection of mid-turbine frame 57 may displace or otherwise influence the operation of bearing system 38. A support strut 100 (a rod may also be used in place of a strut) may be coupled to an outer case 102 and provide support to inner gas path edge 106 and outer gas path edge 104 of mid-turbine frame 57. Strut 100 may also be coupled to inner case 110. An inner case 110 of mid-turbine frame 57 may be a static (i.e., non-rotating) structure disposed radially inward from outer case 102. In various embodiments, mid-turbine frame 57 and inner case 110 may be made from an austenitic nickelchromium-based alloy such as that sold under the trademark Inconel®, which is available from Special Metals Corporation of New Hartford, N.Y., USA. Inner case 110 may be cast or forged with features on inner case 110 machined.

Figure 3:
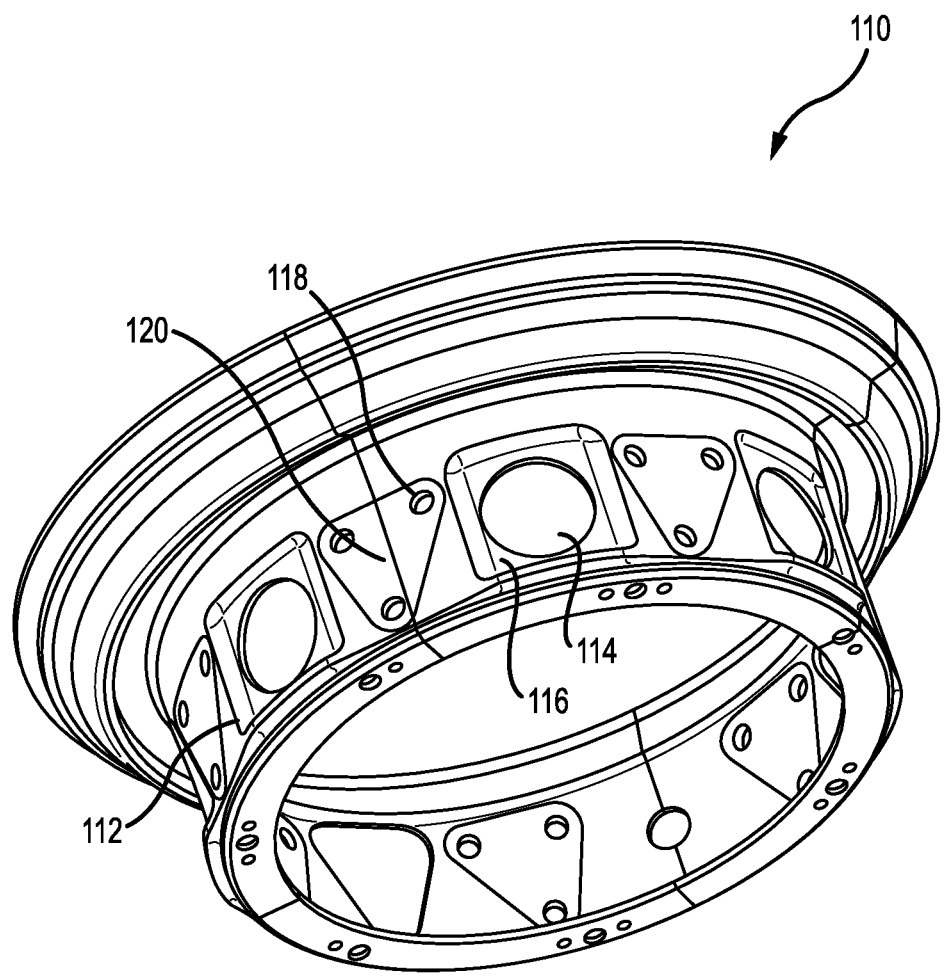
FIG. 3 illustrates an inner diameter of a mid-turbine frame with holes incorporated in the mid-turbine frame to balance deformation, in accordance with various embodiments.

With reference to FIG. 3, inner case 110 is shown, in accordance with various embodiments. Inner case 110 may be an annulus with a surface 112 comprising a circular and circumferential contour such that surface 112 forms a flattened and annular ring. Balancing sections 116 may be disposed about surface 112 with openings 114 defined by balancing sections 116 of surface 112. Surface 112 may also comprise interface sections 120 having interface features 118 defined on and/or by interface sections 120. Interface sections 120 may be configured to receive fasteners. Support struts may be coupled to interface sections 120.

In various embodiments, openings 114 may be deflection balancing openings positioned about inner case 110 to limit deformation during use. Openings 114 may be distributed about surface 112 of inner case 110 to improve the symmetry of inner case 110 in terms of symmetry about the circumference of surface 112. In that regard, openings 114 may limit elongation of the circular geometry of surface 112 as inner case 110 heats and/or cools.

In various embodiments, multiple openings 114 may be distributed about surface 112 of inner case 110 to more evenly distribute stiffness about the case relative to inner case 110 without openings 114. Openings 114 may be depicted as circular in geometry, however elliptical, slotted, rectangular, triangular, polygonal, or other shaped openings may also be formed in inner case 110 to balance deformation in response to a thermal change or a mechanical change. A thermal change may include heating or cooling. A mechanical change may be induced by rotational forces in a gas turbine engine and/or gas pressure. Balancing section 116 with openings 114 may also maintain a location of a center point of inner case 110 in response to a thermal change. Although inner case 110 is depicted openings 114 may be formed in any circular engine component to limit deflection relative to the engine center line A-A' (of FIG. 1) and/or deformation in response to a thermal change.

Figure 4:
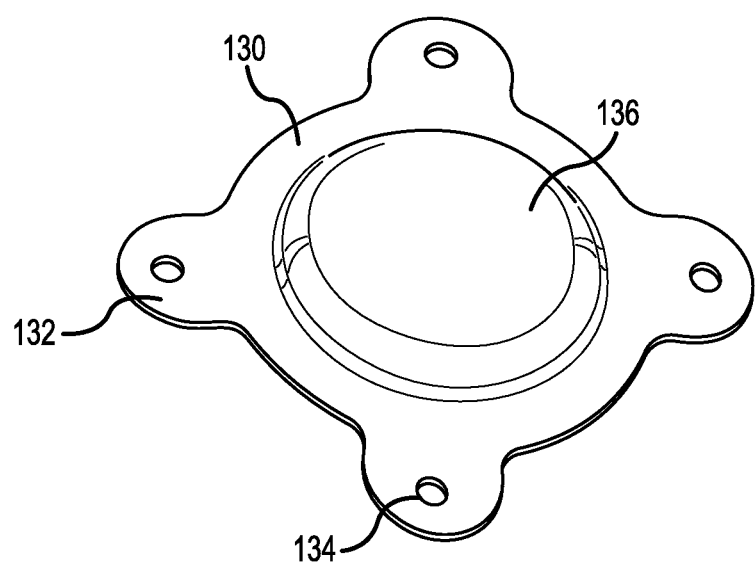
FIG. 4 illustrates a cover for a deformation balancing opening in a mid-turbine frame, in accordance with various embodiments.
Figure 5:
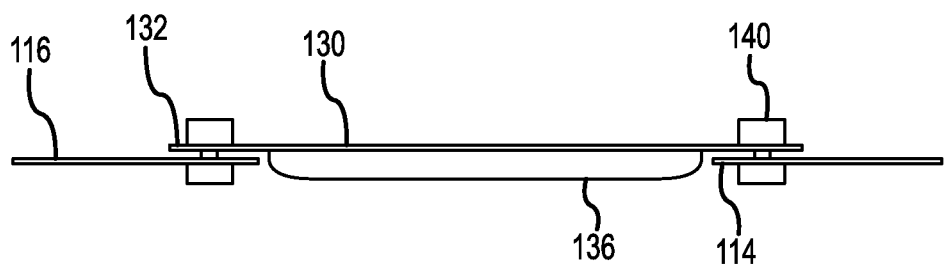
FIG. 5 illustrates a cover installed in a deformation balancing opening, in accordance with various embodiments.

With reference to FIGS. 4 and 5, a metal cover 130 is shown, in accordance with various embodiments. Metal cover 130 may be configured to cover opening 114. Metal cover 130 may comprise attachment flanges 132 defining openings 134 configured to receive fasteners 140 (e.g., rivets or bolts). Fasteners 140 may removably fix metal cover 130 to inner case 110 (of FIG. 3). Protrusion 136 may be configured to rest in opening 114 in response to metal cover 130 being mounted to balancing sections 116. Metal cover may be a non-structural cover configured to limit thermal radiation through opening 114. In that regard, metal cover 130 may further reduce the deformation by limiting the permeation of heat.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mid-turbine frame of a gas turbine engine, comprising:
   an inner case having an annular surface, the inner case positioned radially interior to an inner wall of a combustion product path through a turbine section of the gas turbine engine;
   an interface section on the annular surface comprising an interface feature; and
   a balancing section on the annular surface, the balancing section defining an opening through the inner case, wherein the balancing section is disposed circumferentially adjacent the interface section; and
   a metal cover mounted to the balancing section, the metal cover comprising an attachment flange configured to receive a fastener, and a protrusion configured to rest in the opening in the balancing section.

2. The mid-turbine frame of claim 1, wherein the metal cover is riveted to the annular surface.

3. The mid-turbine frame of claim 1, wherein the annular surface comprises a plurality of balancing sections defining a plurality of openings with the plurality of balancing sections distributed about the annular surface.

4. The mid-turbine frame of claim 1, wherein the inner case is configured to maintain a circular geometry in response to at least one of a mechanical change or a thermal change.

5. The mid-turbine frame of claim 4, wherein the inner case is configured to maintain a stationary center point in response to at least one of the mechanical change or the thermal change.

6. The mid-turbine frame of claim 1, wherein the inner case comprises an austenitic nickel-chromium-based alloy.

7. A gas turbine engine, comprising:
a compressor configured to rotate about an axis;
a combustor aft of the compressor and in fluid communication with the compressor;
a high-pressure turbine aft of the compressor and in fluid communication with the combustor;
a low-pressure turbine aft of the high-pressure turbine and in fluid communication with the high-pressure turbine; and
a mid-turbine fame disposed between the high-pressure turbine and the low-pressure turbine, the mid-turbine frame comprising:
an inner case having an annular surface, the inner case positioned radially interior to an inner wall forming a combustion product path;
an interface section on of the annular surface comprising an interface feature,
a balancing section of the annular surface defining an opening and disposed circumferentially adjacent the interface section; and
a metal cover mounted to the balancing section, the metal cover comprising an attachment flange configured to receive a fastener, and a protrusion configured to rest in the opening in the balancing section.

8. The gas turbine engine of claim 7, wherein the metal cover is riveted to the mid-turbine frame.

9. The gas turbine engine of claim 7, wherein the mid-turbine frame comprises a plurality of balancing sections defining a plurality of openings with the plurality of balancing sections distributed about the mid-turbine frame.

10. The gas turbine engine of claim 7, wherein the mid-turbine frame is configured to maintain a circular geometry in response to at least one of a mechanical change or a thermal change.

11. The gas turbine engine of claim 10, wherein the mid-turbine frame is configured to maintain a stationary center point in response to at least one of the mechanical change or the thermal change.

12. The gas turbine engine of claim 7, wherein the mid-turbine frame comprises nickel-chromium-based alloy.

13. The gas turbine engine of claim 7, wherein the mid-turbine frame comprises:
an outer case disposed radially outward from the inner case; and
a strut coupled to the inner case and the outer case.

14. A static structure of a mid-turbine frame of a gas turbine engine, comprising:
a casing having an annular surface, the casing positioned radially interior to an inner wall of a combustion product path through a turbine section of the gas turbine engine;
an interface section of the annular surface comprising an interface feature;
a balancing section of the annular surface defining an opening and disposed circumferentially adjacent the interface section; and
a metal cover mounted to the balancing section, the metal cover comprising an attachment flange configured to receive a fastener, and a protrusion configured to rest in the opening in the balancing section.

15. The static structure of claim 14, wherein the metal cover is riveted to the annular surface.

16. The static structure of claim 14, wherein the annular surface is configured to maintain a circular geometry in response to at least one of a mechanical change or a thermal change.

17. The static structure of claim 16, wherein the annular surface is configured to maintain a stationary center point in response to at least one of the mechanical change or the thermal change.

* * * * *